United States Patent [19]

Kaneko et al.

[11] Patent Number: 4,763,994

[45] Date of Patent: Aug. 16, 1988

[54] METHOD AND APPARATUS FOR DRIVING FERROELECTRIC LIQUID CRYSTAL OPTICAL MODULATION DEVICE

[75] Inventors: Shuzo Kaneko, Tokyo; Tsutomu Toyono, Yokohama, both of Japan

[73] Assignee: Canon Kabushiki Kaisha, Tokyo, Japan

[21] Appl. No.: 76,178

[22] Filed: Jul. 21, 1987

[30] Foreign Application Priority Data

Jul. 23, 1986 [JP] Japan .................. 61-174045

[51] Int. Cl.[4] .............................................. G02F 1/13
[52] U.S. Cl. .................................. 350/336; 350/333; 350/350S; 340/765; 340/804
[58] Field of Search ................. 350/333, 336, 350 S; 340/765, 804

[56] References Cited

U.S. PATENT DOCUMENTS

| | | | |
|---|---|---|---|
| 3,705,310 | 12/1972 | Wild | 350/336 X |
| 4,021,798 | 5/1977 | Kojima et al. | 350/336 X |
| 4,390,244 | 6/1983 | Hareng et al. | 350/333 |
| 4,516,835 | 5/1985 | Suzuki et al. | 350/336 |
| 4,655,561 | 4/1987 | Kanbe et al. | 350/350 S |
| 4,681,404 | 7/1987 | Okada et al. | 350/336 X |
| 4,712,877 | 12/1987 | Okada et al. | 350/333 X |

*Primary Examiner*—Stanley D. Miller
*Assistant Examiner*—Richard Gallivan
*Attorney, Agent, or Firm*—Fitzpatrick, Cella, Harper and Scinto

[57] ABSTRACT

An optical modulation device comprises a plurality of pixels arranged in a plurality of lines. Each pixel is electrically connected to an optical modulation material, such as ferroelectric liquid crystal, showing a first and a second orientation state depending on an applied electric field and is composed to be capable of forming a potential gradient. The optical modulation device is driven to provide a gradation display by a method comprising a first step of forming in a line of pixels a written state in a width exceeding a prescribed width, and a second step of erasing an excess width to leave the written state in the prescribed width.

13 Claims, 10 Drawing Sheets

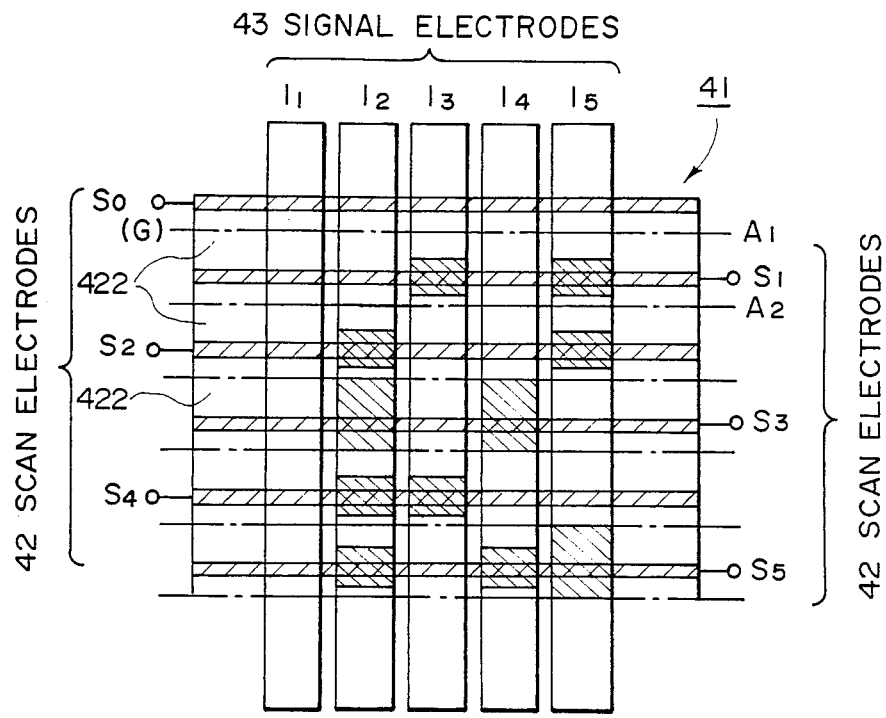
F I G. 5
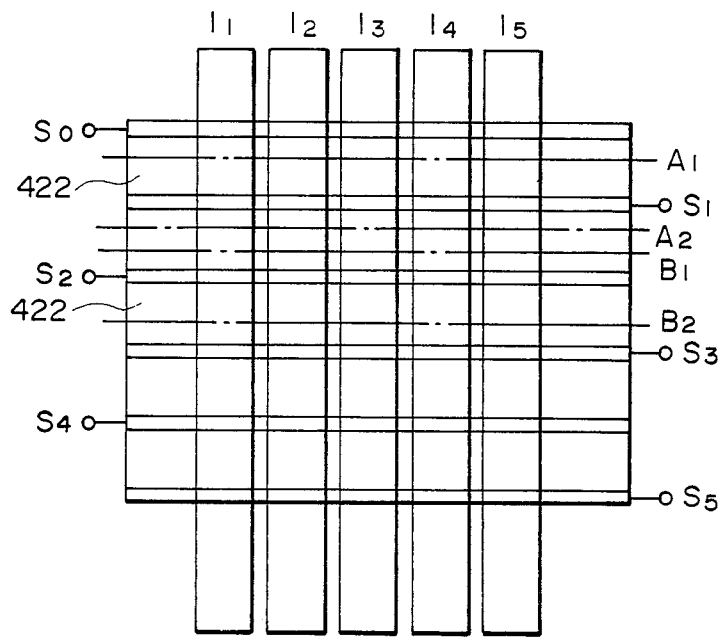
F I G. 6

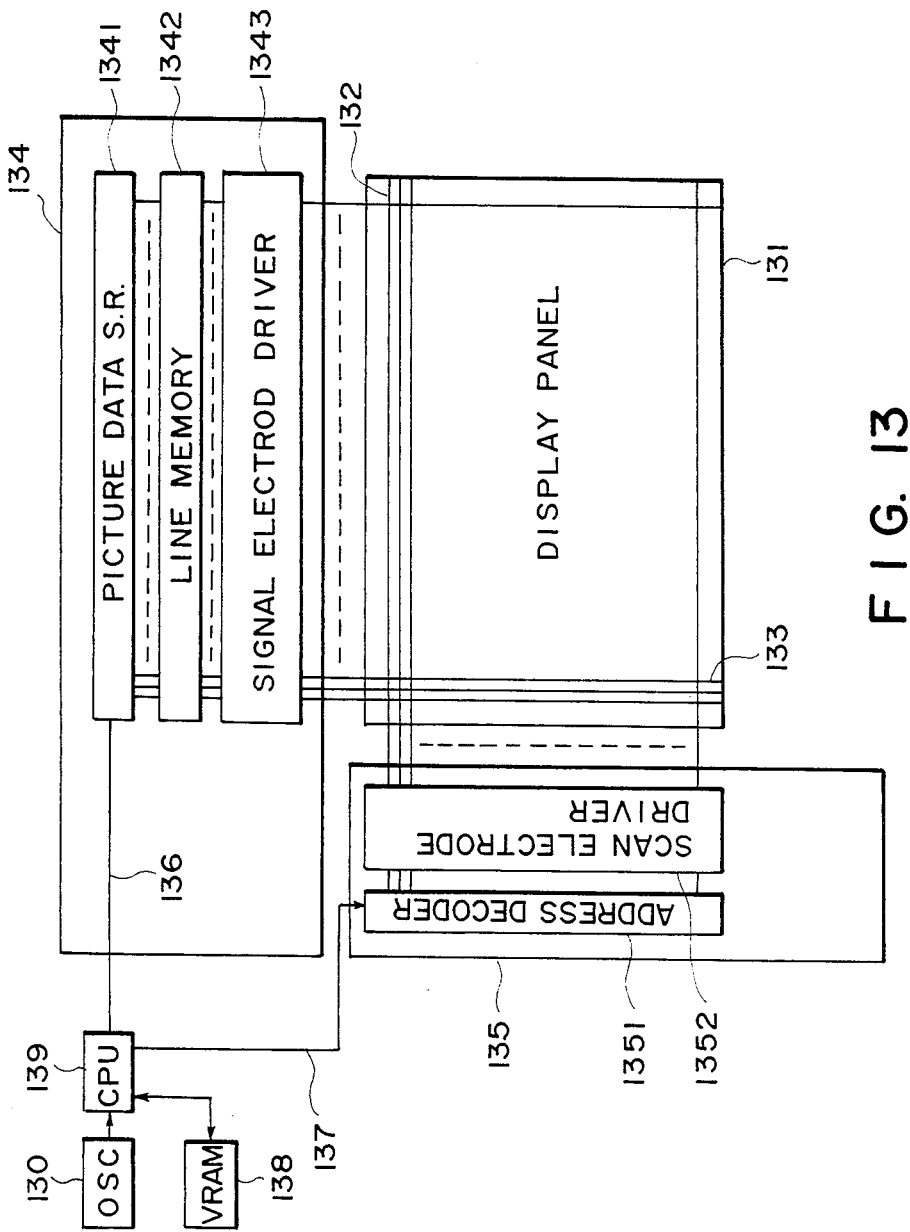
F I G. 13

METHOD AND APPARATUS FOR DRIVING FERROELECTRIC LIQUID CRYSTAL OPTICAL MODULATION DEVICE

FIELD OF THE INVENTION AND RELATED ART

The present invention relates to a method and an apparatus for driving an optical modulation device, particularly a ferroelectric liquid crystal device showing at least two stable states.

Hitherto, there is well known a type of liquid crystal device wherein scanning electrodes and signal electrodes are arranged in a matrix, and a liquid crystal compound is filled between the electrodes to form a large number of pixels for displaying images or information. As a method for driving such a display device, a time-division or multiplex driving system wherein an address signal is sequentially and periodically applied to the scanning electrodes selectively while prescribed signals are selectively applied to the signal electrodes in a parallel manner in phase with the address signal, has been adopted.

Most of liquid crystals which have been put into commercial use as such display devices are TN (twisted nematic) type liquid crystals, as described in "Voltage-Dependent Optical Activity of a Twisted nematic Liquid Crystal" by M. Schadt and W. Helfrich, Applied Physics Letters, Vol. 18, No. 4 (Feb. 15, 1971) pp. 127–128.

In recent years, as an improvement on such conventional liquid crystal devices, the use of a liquid crystal device showing bistability has been proposed by Clark and Lagerwall in Japanese Laid-Open patent application No. 107216/1981, U.S. Pat. No. 4,367,924, etc. As bistable liquid crystals, ferroelectric liquid crystals showing chiral smectic C phase (SmC*) or H phase (SmH*) are generally used. These liquid crystal materials have bistability, i.e., a property of assuming either a first stable state or a second stable state and retaining the resultant state when the electric field is not applied, and has a high response speed in response to a change in electric field, so that they are expected to be widely used in the field of a high speed and memory type display apparatus, etc.

However, this bistable liquid crystal device may still involve a problem that the switching between the first and second stable states is so fast that it is difficult to control an intermediate level between the two stable states. For this reason, it has been difficult to display an intermediate gradation.

There have been proposed ferroelectric liquid crystal display systems aimed at solving the above problem, by U.S. Pat. No. 4,655,561 and U.S. patent applications Ser. Nos. 931,082 and 934,920.

SUMMARY OF THE INVENTION

An object of the present invention is to provide a further improvement in method and apparatus for driving an optical modulation device as described above.

A more specific object of the present invention is to provide a method and apparatus for driving an optical modulation device, particularly suited for providing a gradational display according to multiplexing device.

According to the present invention, there is provided a driving method for an optical modulation device comprising a plurality of pixels arranged in a plurality of lines, each pixel being electrically connected to an optical modulation material and capable of forming a potential gradient when supplied with a voltage; said driving method comprising: a first step of forming in a line of pixels a written state in a width exceeding a prescribed width, and a second step of erasing an excess width to leave the written state in the prescribed width.

According to the present invention, there is further provided an optical modulation apparatus which comprises: an optical modulation device comprising a resistive film having thereon a plurality of elongated low-resistivity electrodes electrically connected to the resistive film, a plurality of elongated opposite electrodes disposed opposite to and intersecting with the low-resistivity electrodes, and an optical modulation material disposed between the resistive film and the opposite electrodes and showing a first and a second orientation state depending on an electric field applied thereto; and means for applying in an address period an address voltage signal to address a low-resistivity electrode thereby to form a potential gradient along a portion of the resistive film between the addressed low-resistivity electrode and an n-th ($n \geq 2$) low-resistivity electrode from the addressed low-resistivity electrode; and in the address period, applying to the opposite electrodes a voltage signal which in combination with the address voltage signal orients the optical modulation material to the first orientation state in a width perpendicular to the low-resistivity electrodes, and applying to a selected opposite electrode a voltage signal which in combination with the address voltage signal orients the optical modulation material to the second orientation state in said width.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a plan view of matrix pixels with display states obtained by using the driving signals shown in FIGS. 4A and 4B;

FIG. 6 is a plan view schematically indicating a region to be erased or to be written in "black";

FIG. 13 is a block diagram of a ferroelectric liquid crystal panel according to the present invention.

DESCRIPTION OF THE PREFERRED EMBODIMENTS

As an optical modulation material used in a driving method according to the present invention, a material showing at least two stable states, particularly one showing either a first optically stable state or a second optically stable state depending upon an electric field applied thereto, i.e., bistability with respect to the applied electric field, particularly a liquid crystal having the above-mentioned property, may suitably be used.

Preferable liquid crystals having bistability which can be used in the driving method according to the present invention are chiral smectic liquid crystals having ferroelectricity. Among them, chiral smectic C (SmC*) or H (SmH*)-phase liquid crystals are suitable therefor. These ferroelectric liquid crystals are described in, e.g., "LE JOURNAL DE PHYSIQUE LETTRES", 36 (L-69), 1975 "Ferroelectric Liquid Crystals"; "Applied Physics Letters" 36 (11) 1980, "Submicro Second Bistable Electrooptic Switching in Liquid Crystals": "Kotai Butsuri (Solid State Physics)" 16 (141), 1981 "Liquid Crystal", U.S. Pat. Nos. 4561726, 4589996, 4592858, 4596667, 4613209, 4614609 and 4622165, etc. Ferroelectric liquid crystals disclosed in these publications may be used in the present invention.

More particularly, examples of ferroelectric liquid crystal compound used in the method according to the present invention include decyloxybenzylidene-p'-amino-2-methylbutylcinnamate (DOBAMBC), hexyloxybenzylidene-p'-amino-2-cyloropropylcinnamate (HOBACPC), 4-O-(2-methyl)-butylresorcylidene-4'-octylaniline (MBRA8), etc.

When a device is constituted by using these materials, the device can be supported with a block of copper, etc., in which a heater is embedded in order to realize a temperature condition where the liquid crystal compounds assume an SmC*- or SmH*-phase.

Further, a ferroelectric liquid crystal formed in chiral smectic F phase, I phase, J phase, G phase or K phase may also be used in addition to those in SmC* or SmH* phase in the present invention.

Figure 1:
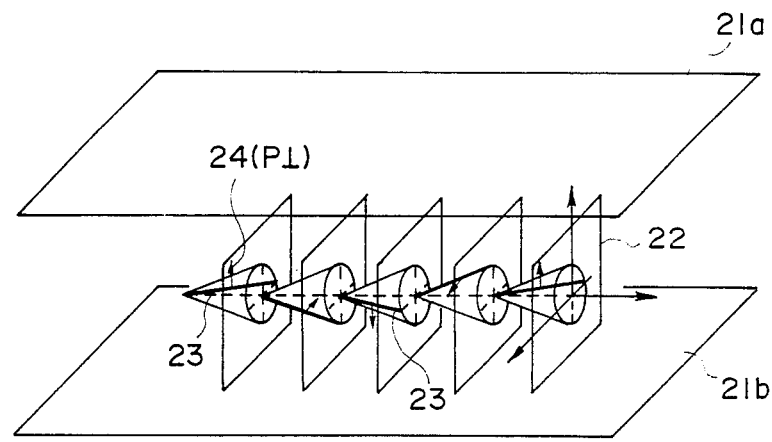
FIGS. 1 and 2 are schematic perspective views for illustrating the operation principles of a ferroelectric liquid crystal device used in the present invention.
Figure 2:
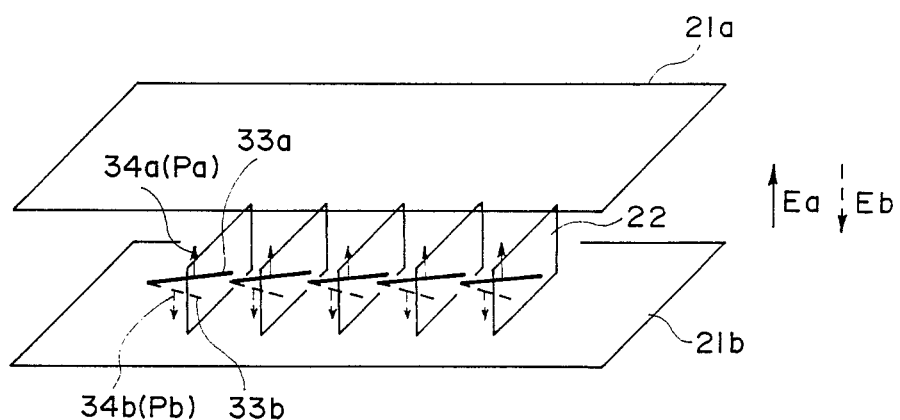

Referring to FIG. 1, there is schematically shown an example of a ferroelectric liquid crystal cell. Reference numerals 21a and 21b denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 22 are oriented perpendicular to surfaces of the glass plates is hermetically disposed therebetween. A full line 23 shows liquid crystal molecules. Each liquid crystal molecule 23 has a dipole moment ($P_\perp$) 24 in a direction perpendicular to the axis thereof. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments ($P_\perp$) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics such as contrast vary depending upon the polarity of an applied voltage. Further, when the thickness of the liquid crystal cell is sufficiently thin (e.g., 1 $\mu$), the helical structure of the liquid crystal molecules is unwound without application of an electric field whereby the dipole moment assumes either of the two states, i.e., Pa in an upper direction 34a or Pb in a lower direction 34b as shown in FIG. 2. When electric field Ea or Eb higher than a certain threshold level and different from each other in polarity as shown in FIG. 2 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented to either of a first stable state 33a and a second stable state 33b.

When the above-mentioned ferroelectric liquid crystal is used as an optical modulation device, it is possible to obtain two advantages. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented to the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$, particularly 1 to 5 $\mu$.

Figure 3:
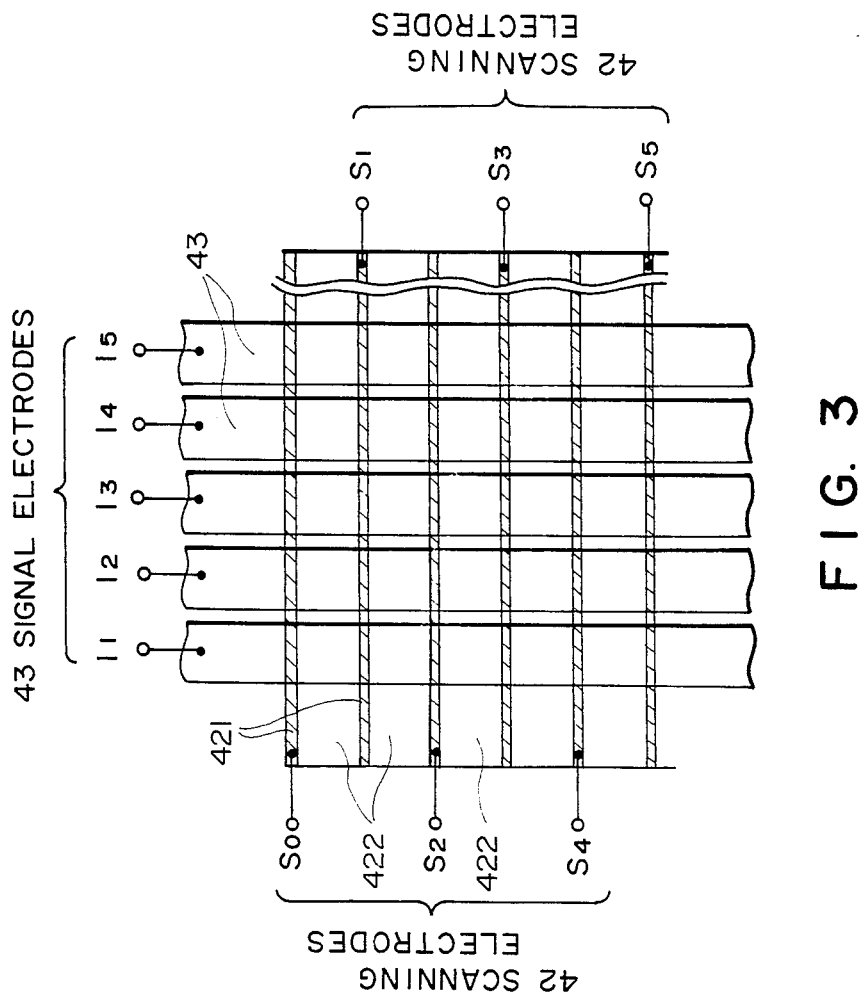
FIG. 3 is a plan view of a matrix pixel arrangement used in the present invention.

An embodiment of optical modulation device used in the present invention will be explained hereinbelow. FIG. 3 shows an embodiment of matrix optical modulation device, which is effectively applicable to a gradational display.

The optical modulation device comprises signal electrodes 43 of low-resistivity transparent conductor films of ITO, etc., connected to terminals $I_1$–$I_5$..., respectively, low-resistivity scanning electrodes 421 of Al, Au, etc., connected to terminals $S_0$–$S_5$..., respectively, and transparent high resistivity films 422 (having a sheet resistivity of, e.g., $10^5 - 10^8$ $\Omega/\square$) of $SnO_2$, $TiO_2$, etc. connected to and sandwiched between the low-resistivity scanning electrodes $S_0$–$S_5$.... Between the scanning electrodes 42 and signal electrodes 43, the above-mentioned ferroelectric liquid crystal is sandwiched, optionally, by the medium of a dielectric layer, an alignment film, etc.

Figures 4A, 4B:
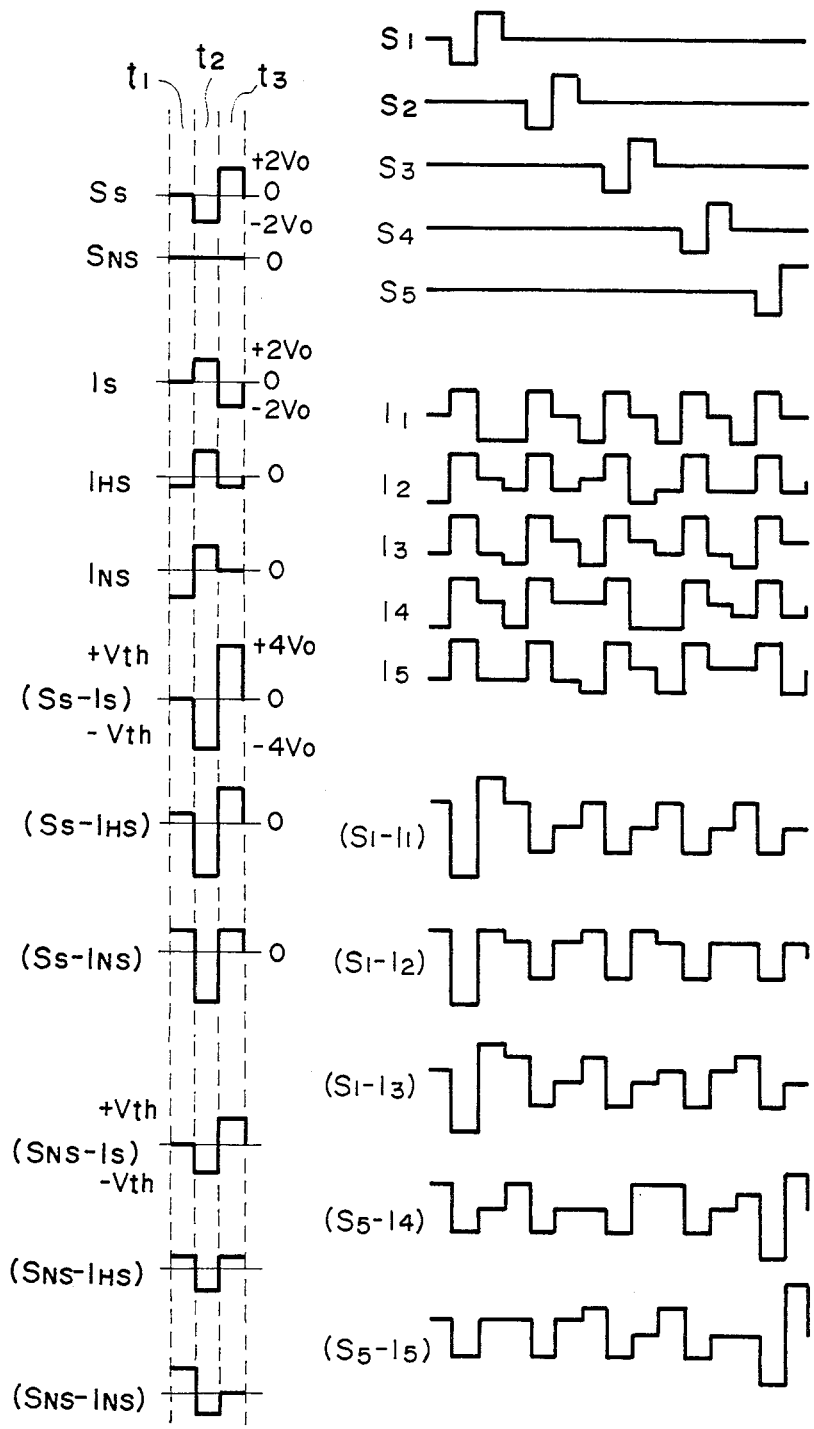
FIG. 4A shows signal waveforms used in the driving method according to the present invention.
FIG. 4B is a time chart showing the succession of the signals shown in FIG. 4A.

FIGS. 4A and 4B show a set of driving waveforms applied to scanning electrodes $S_S$ and $S_{NS}$ among the scanning electrodes and signal electrodes $I_S$, $I_{HS}$ and $I_{NS}$ among the signal electrodes, and also voltage waveforms applied to the intersections of these electrodes. In FIGS. 4A and 4B, the abscissa represents time, and the ordinate represents a potential level (or voltage).

The present invention is applicable to a multi-level or analog gradational display, but for brevity of explanation, a case wherein three levels of "white", one intermediate level and "full black" are displayed will be explained.

FIGS. 4A and 4B show a specific example set of driving waveforms for effecting image erasure and writing for each line. The pixels or picture after the writing corresponds to that shown in FIG. 5.

More specifically, referring to FIG. 4A, at $S_S$ is shown a voltage signal or driving waveform for addressing a low-resistivity scanning electrode selected for writing image information, and at $S_{NS}$ is shown a driving signal waveform applied to a non-selected low-resistivity scanning electrode. Further, at $I_S$ is shown a driving signal waveform for writing "full black" in a pixel on the selected or addressed line. At $I_{HS}$ is shown a driving signal waveform for writing the intermediate level, and at $I_N$ is shown a driving signal waveform for writing "white".

At this time, the liquid crystal at the respective intersections is supplied with voltages shown at $I_S-S_S$, $I_{HS}-S_S$, $I_{NS}-S_S$, $I_S-S_{NS}$, $I_{HS}-S_{NS}$ and $I_{NS}-S_{NS}$, respectively.

Herein, the driving voltage $V_0$ is so selected as to satisfy a relation of, e.g., $|\pm 2V_0| < |V_{th}| < |\pm 3V_0|$ in connection with the inversion threshold voltage $V_{th}$ of a bistable ferroelectric liquid crystal used. Depending on the kind and condition of an aligning treatment, etc., applied to the cell, the threshold voltage $V_{th}$ can be slightly different between its $\oplus$ side and $\ominus$ side in some cases. In such a case, the respective driving waveforms may be somewhat changed, e.g., by biasing the base potential level to some extent. For brevity of explanation, however, it is assumed that the threshold voltage is the same on the positive polarity and negative polarity sides.

When the voltage $V_0$ is set in the above described manner, if a voltage having its absolute value of below $2V_0$ is applied to the liquid crystal at a pixel, no inversion between liquid crystal molecular orientations occurs but if the absolute value exceeds $2V_0$, the inversion occurs with its degree being intensified as the absolute value increases.

Now, the respective waveforms are explained more specifically with reference to FIG. 4A.

So as to effect one line of writing in a period divided into three phases $t_1$, $t_2$ and $t_3$, a selected scanning electrode $S_S$ is supplied with a voltage of $-2V_0$ at the second phase $t_2$ in order to effect erasure of a line, and a voltage of $+2V_0$ at the third phase $t_3$ in order to write in pixels depending on signals applied to the signal electrodes. Further, at the first phase $t_1$, the scanning electrode $S_S$ is auxiliarily supplied with such a voltage signal as to prevent a voltage exceeding the threshold voltage from being applied to the liquid crystal at a pixel concerned in combination with the voltage signal applied to the corresponding signal electrode.

On the other hand, each nonselected scanning electrode $S_{NS}$ is fixed at the base potential (0 volt in this embodiment).

Then, with respect to the voltage signal (or potential) waveforms applied to the signal electrodes in substantial synchronism with the phases of the signals applied to the selected scanning electrode, an erasure signal voltage $+2V_0$ is applied at the second phase. As a result, at this phase, a voltage of $-4V_0$ is applied between the selected scanning electrode $S_S$ and the respective signal electrodes, where all the portions on this line are inverted to the erasure (white) side as the voltage of $-4V_0$ exceeds the inversion threshold of $-V_{th}$. Then, at the third phase, the signal electrodes intersecting with the selected scanning electrode $S_S$ are supplied with voltage signals corresponding to respectively given gradation data. Herein, the potential (voltage signal) for writing "black" is assumed to be $-2V_0$; the potential for writing the intermediate level, $-V_0$; and the potential for writing "white", zero (reference potential).

Then, the first phase for auxiliary application will be explained. At the first phase, a signal of a potential depending on the potential of the pixel writing signal applied at the above mentioned third phase. More specifically, it is preferred that the potential of the signal applied at this phase is of the same polarity as that of the signal applied to the signal electrode at the third phase or zero (reference potential), and the total of the potential and that at the third phase is almost the same as the potential at the second phase.

FIG. 4B shows the succession of these voltage signals or potentials with respect to the respective electrodes and some representative pixels or intersections.

FIG. 5 shows matrix pixel states formed by application of the driving waveforms shown in FIG. 4. In this instance, the scanning electrode $S_0$ is always placed at zero (reference potential). In the above arrangement, there is formed a potential gradient of about $2V_0$ along the resistive films 422 between the selected scanning electrode and a non-selected scanning electrode. More specifically, when $S_1$ is supplied with a potential of $2V_0$ at the time of writing, a potential of $V_0$ results at the mid points toward $S_0$ and $S_2$. In this instance, when the signal electrodes are supplied with prescribed voltage signals, the liquid crystal along the resistive films 422 is supplied with different voltages and only the portions thereof supplied with a voltage exceeding the threshold are written in "black". In FIG. 5, a region between a pair of dot-and-dash lines including a part of a scanning electrode corresponds to a pixel.

The above operation will be explained in somewhat more detail with reference to a driving mode including line-erasure. When a scanning electrode $S_1$ is selected and the respective signal electrodes are supplied with a voltage signal, the region of line erasure or the region written in "black" is defined by a region between two dot-and-dash lines $A_1$ and $B_1$ shown in FIG. 6 which are almost equally distant from $S_1$. Thus, this region is once wholly erased into "white". Thereafter, if the voltage signal is for "black", the region with the scanning electrode $S_1$ at the center is almost wholly written into "black"; if the voltage signal is for the intermediate level, a part of the region is written into "black"; and if the voltage signal is for "white", the region is retained in "white". Then, when a scanning electrode $S_2$ is selected, the region between lines $A_2$ and $B_2$ in FIG. 6 is once wholly erased into white, and then in this region, "black", the intermediate level or "white" is determined in the above manner. As a result, by repeating the above operation while sequentially selecting the scanning electrodes, a picture as shown in FIG. 5 is formed.

Figure 7:
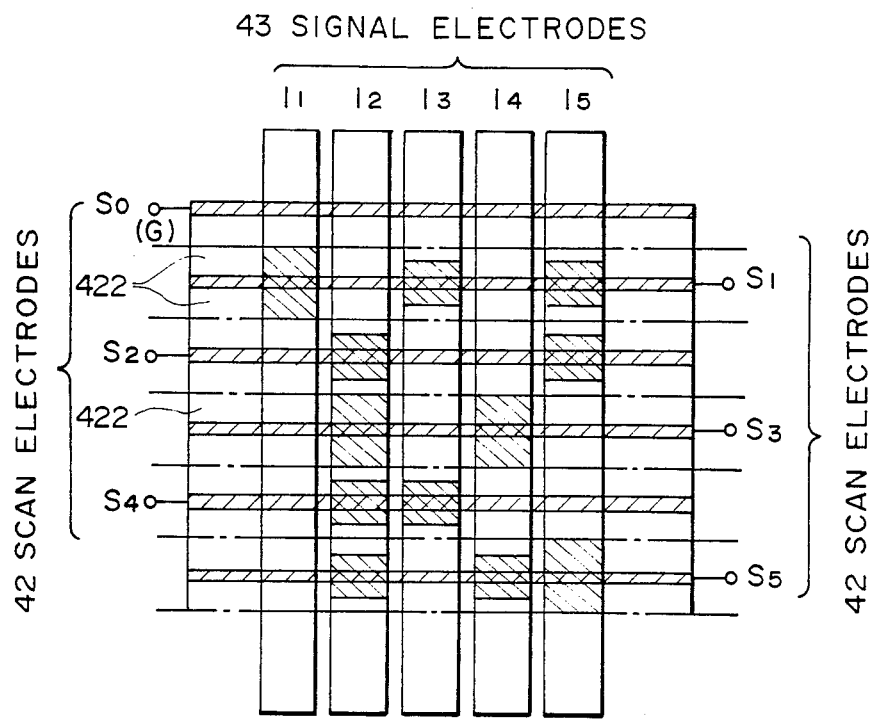
FIG. 7 is a plan view of matrix pixels with display states obtained by a method other than a preferred embodiment of the present invention.

Alternatively, by appropriately selecting (reducing) the maximum voltage applied to a pixel, it is possible to form a picture with pixels spaced apart from each other at mid lines between scanning electrodes as shown in FIG. 7. This is for example accomplished by setting the maximum voltage applied to the liquid crystal to be a voltage exceeding the threshold by $V_0$ in terms of the absolute value if the absolute value of the gradient formed between scanning electrodes is $2V_0$ as shown in FIG. 4.

However, some advantages are attained by adopting a method explained with reference to FIG. 5 wherein written pixels are formed wider than a prescribed one line, and before a subsequent line is written, a part of the written pixels is erased for writing in the subsequent line. For example, if the method of FIG. 5 is used, connection between pixels in the scanning direction is ensured, e.g., when "full black" is successively written. A possible fluctuation in resistivity of the resistive films can be absorbed. Further, a large flexibility is attained as the maximum value can be selected freely as far as it is larger than the absolute value of the threshold by the magnitude of $|V_0|$ or larger.

In the above, it is possible that the voltage value for writing "black" in one whole pixel is different from that required for writing "white". This may be compensated by appropriate values therefor.

Next, another embodiment of the present invention will be explained with reference to FIGS. 8 et seq.

Figure 8:
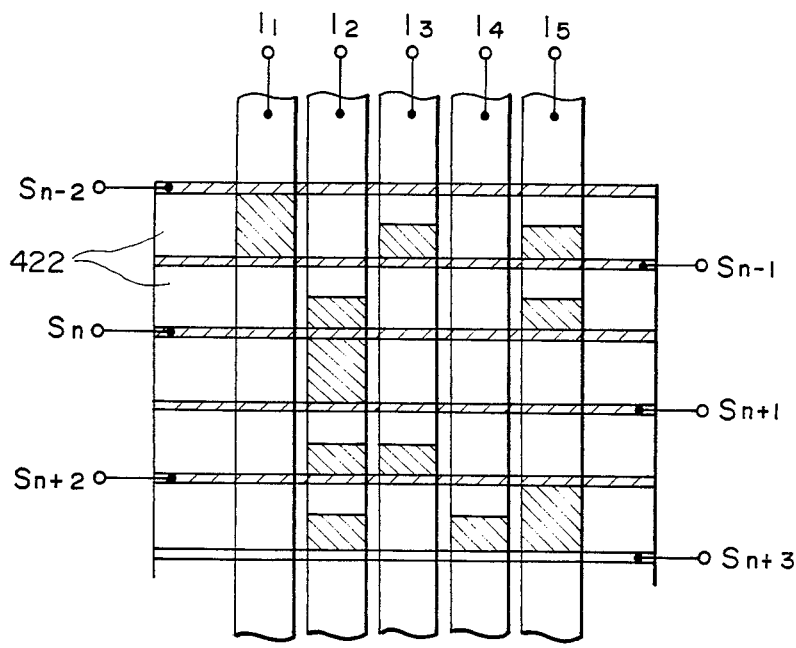
FIG. 8 is a plan view showing another display embodiment according to the present invention.

FIG. 8 shows an exemplary picture obtained by writing in a matrix shown in FIG. 3 by another embodiment of the driving method.

This embodiment is characterized in that line pixels are formed with respective scanning electrodes $S_{n-1}$, $S_n$, $S_{n+1}$, $S_{n+2}$ ... as boundaries.

Figure 9:
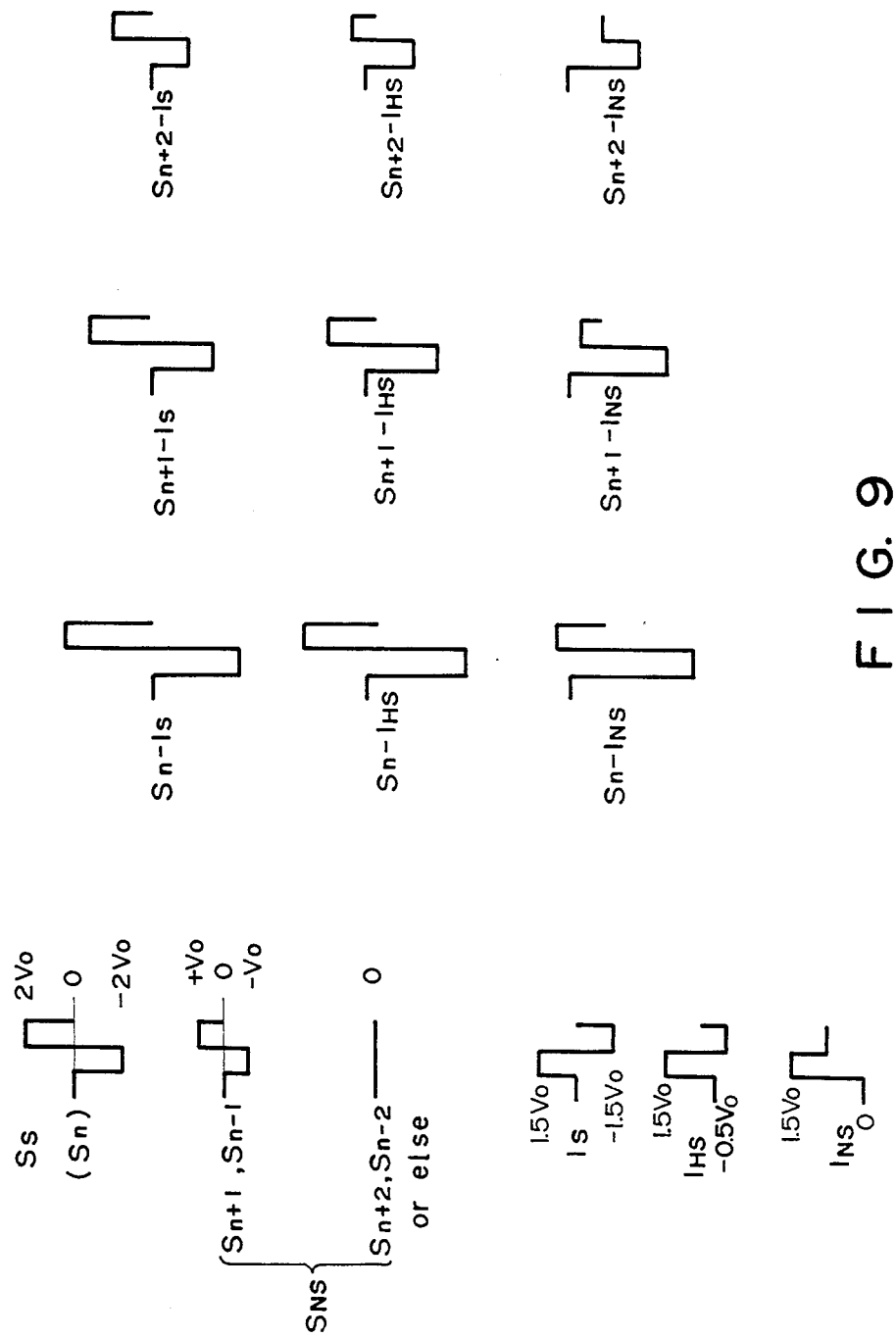
FIGS. 9 and 11 respectively show another set of driving signal waveforms used in the present invention.

FIG. 9 shows an exemplary set of driving waveforms applicable to this writing embodiment. In the embodiment of FIG. 9, one line is written in three phases wherein a line erasure signal is applied at the second phase, an image-writing signal is applied at the third phase, and an auxiliary signal is at the first phase.

First of all, a scanning electrode $S_n$ is taken as a selected scanning electrode $S_S$ and is supplied with a voltage of $-2V_0$ at the second phase and a voltage of $2V_0$ at the third phase. Further, scanning electrodes $S_{n-1}$ and $S_{n+1}$ on both sides of the scanning electrode $S_n$ are supplied with, e.g., a half of the voltages applied to $S_n$ at respective phases, and the other scanning electrodes $S_{n-2}$, $S_{n+2}$ ... are held at the reference potential (zero). At this time, $S_{n-1}$ and $S_{n+1}$ may be supplied with the voltage from a power supply or by being made open.

On the other hand, the respective signal electrodes are supplied with a line-erasure signal of $+1.5 V_0$ at the second phase and are, at the third phase, supplied with signals corresponding to given gradation data, i.e., a signal $I_S$ of $-1.5 V_0$ for providing "full black", a signal $I_{HS}$ of $-V_0$ for providing an intermediate level, and a signal $I_{NS}$ of zero (reference potential) for retaining "white" after the line erasure. More specifically, if the potential difference between $-1.5 V_0$ and zero is gradually changed, an analog gradation may be obtained.

Figure 10:
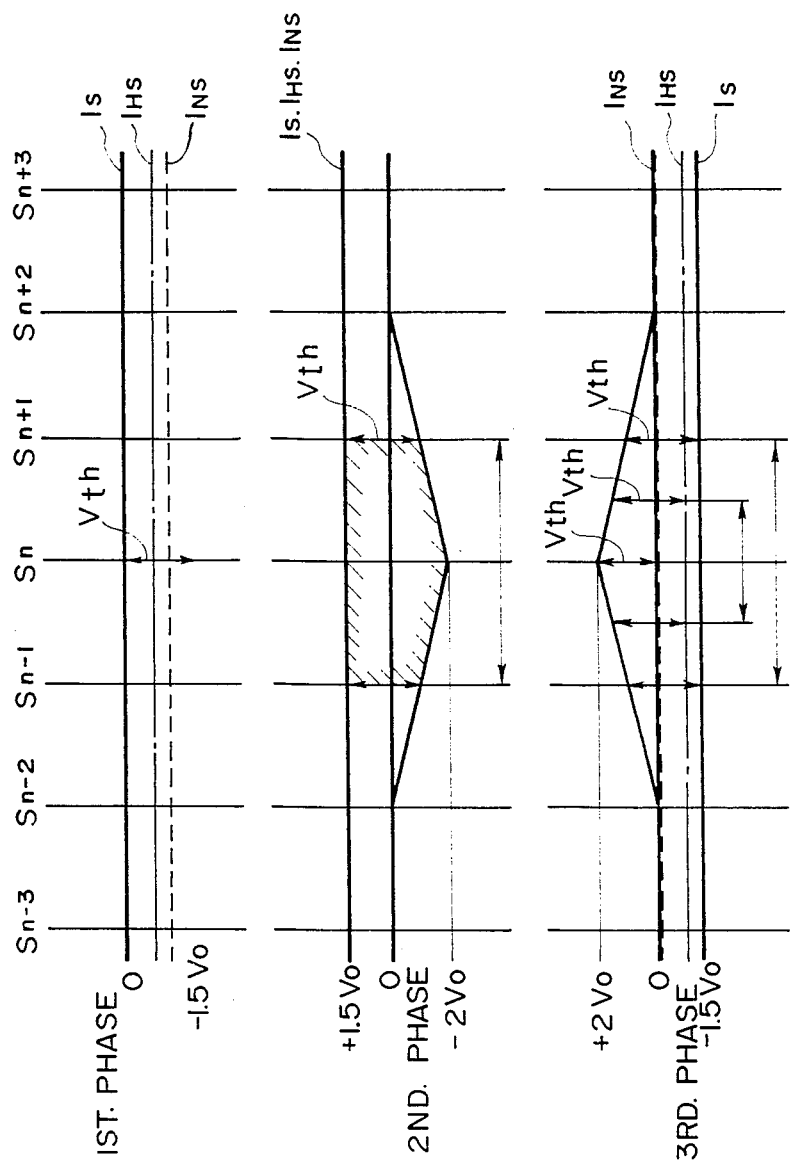
FIGS. 10 and 12 are respectively a schematic view illustrating potential gradients appearing in a pixel at respective phases.

FIG. 10 shows a change in voltage applied to the liquid crystal between a signal electrode noted and the respective scanning electrodes and resistive films connected thereto in the matrix device at the respective phase described above.

In FIG. 10, the signal levels $I_S$, $I_{HS}$ and $I_{NS}$ are represented by a solid line, a dot-and-dash line, and a dash line. Further, a potential gradient when a scanning electrode $S_n$ is selected as $S_S$, i.e., supplied with a signal waveform shown at $S_S$ in FIG. 9, is also indicated by a solid line extending from $S_n$ to $S_{n-2}$ (or $S_{n+2}$) in this embodiment or to further outside electrodes $S_{n-3}$ ... (or $S_{n+3}$ ... ).

Herein, the inversion threshold $|\pm V_{th}|$ is assumed to be 2.5 $V_0$ similarly as above.

At the first phase, all the voltages applied between all the scanning electrodes or resistive films and the signal electrode are smaller than $|\pm 2.5 V_0|$, so that no inversion of the liquid crystal is caused.

At the second, line-erasure phase, the voltage supplied to the signal electrode is constantly $+1.5 V_0$ in any case of $I_S$, $I_{HS}$ and $I_{NS}$. On the other hand, a scanning electrode $S_S$ is supplied with $-2V_0$; scanning electrodes $S_{n-1}$ and $S_{n+1}$ are supplied with $-V_0$; and the other scanning electrodes are placed at the reference potential. As a result, a potential gradient as shown is formed. As a result, the region between $S_{n-1}$ and $S_{n+1}$ is supplied with a potential difference of above 2.5 $V_0$, whereby this region corresponding to two lines is erased into "white".

Then, at the third phase, the scanning electrode $S_n$ is supplied with $+2V_0$ so that a potential gradient as shown is formed. On the other hand, the signal electrode is supplied with a signal level corresponding to a prescribed gradation, i.e., $I_S = -1.5 V_0$, $I_{NS} = -V_0$, or $I_{NS} = 0$, whereby two lines of from $S_{n-1}$ to $S_{n+1}$ are inverted into "black" for $I_S$, and about one line from the mid point between $S_{n-1}$ and $S_n$ to the mid point between $S_n$ and $S_{n+1}$ is inverted into "black" for $I_{HS}$ to provide an intermediate level. Further, in the case of $I_{NS}$, no region is supplied with a voltage exceeding the inversion threshold, so that "white" is retained. As a result, an image is formed on two lines through the above three phases.

Then, when a scanning electrode $S_{n+1}$ is selected as a selected scanning electrode $S_S$ subsequent to $S_n$, a potential gradient is formed with the $S_{n+1}$ as the center as has been explained hereinabove. At the erasure phase with $S_{n+1}$ selected, in the region with an image written in the above step, the region from $S_n$ to $S_{n+1}$ is erased into "white", only the portion of the image in the region from $S_{n-1}$ to $S_n$ is retained within the image written when the scanning electrode $S_n$ is selected as $S_S$, whereby one line of image is formed there.

Similarly, an image formed with selection of $S_{n+1}$ as $S_S$ is retained in the region between $S_n$ and $S_{n+1}$. In this way, one line of image is sequentially written, whereby a picture as shown in FIG. 8 is formed.

A picture written in this embodiment is formed of line pixels written between scanning electrodes composed of Al, Au, etc., so that the boundaries between the pixels are clearly formed and a clearer picture can be obtained.

In the above embodiment, the inversion threshold has been assumed to be $|\pm 2.5 V_0|$, whereas some fluctuation in the threshold value can be compensated by adjusting the level of the voltage signal applied at the second phase and the maximum level of the voltage signal applied at the third phase, respectively, to the signal electrodes.

Figure 11:
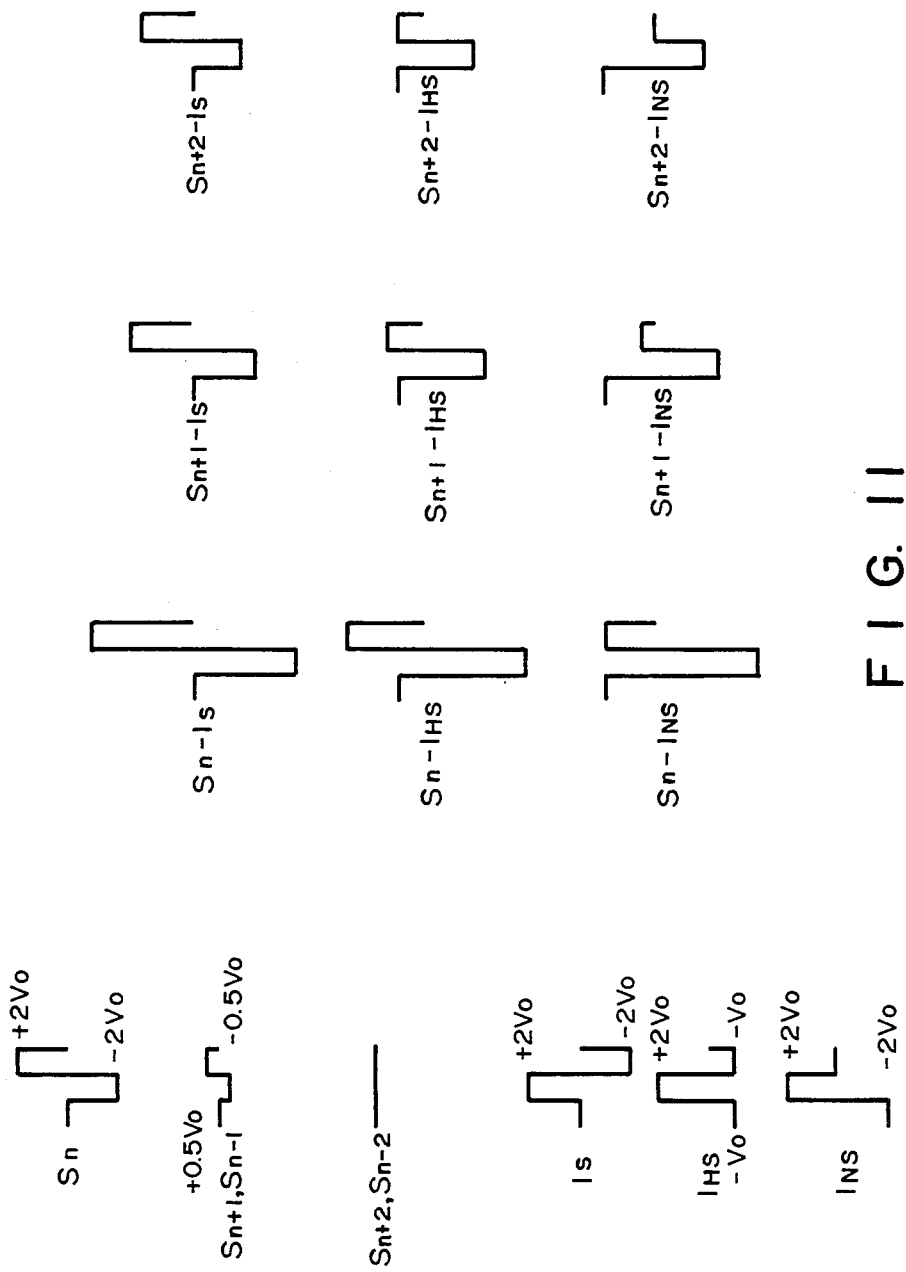
Figure 12:
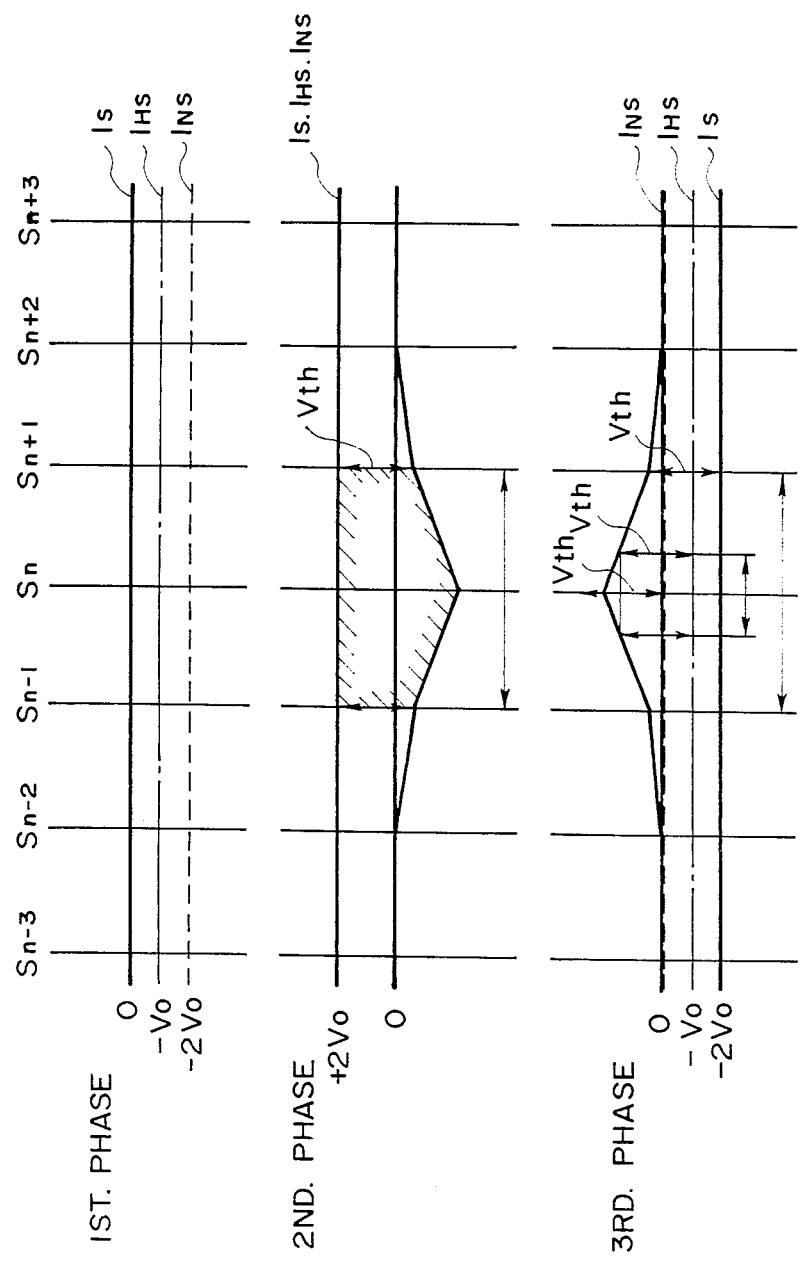

FIG. 11 shows another set of driving signal waveforms applied in a modified embodiment, and FIG. 12 shows corresponding potential and voltage change similar to FIG. 10. In this embodiment, when a scanning electrode $S_n$ is selected as $S_S$, the potential levels of $S_{n-1}$ and $S_{n+1}$ are adjusted by a power supply to write two lines of image similarly as above, and at the time of subsequent line scanning, one line is erased. In this embodiment, the signal electrodes are supplied with $+2V_0$ at the second phase and $|-2V_0|$ at the maximum at the third phase, and both the scanning electrodes $S_{n-1}$ and $S_{n+1}$ are supplied with $-0.5 V_0$ and $+0.5 V_0$ at the second and third phases, respectively, so that the inversion of the liquid crystal is caused in the region ranging from $S_{n-1}$ to $S_{n+1}$ at the time of erasure and at the time of writing "full black". In this case, the intermediate level provided at the third phase by applying $-V_0$ as a signal electrode $I_{HS}$ shown in FIG. 12 forms a different region from that shown in FIG. 10, and the intermediate region can be modified by adjusting the value. Further, similarly as in the previous embodiment, if the voltage signal level at the third phase is changed continuously from 0 to $-2V_0$, an analog gradation may be obtained. In this embodiment, the scanning electrodes $S_n$, $S_{n+1}$... are sequentially selected as $S_S$, so that pixels in a line are written between a pair of scanning electrodes similarly as in the previous embodiment.

In the embodiments shown in FIGS. 8 et seq., at the line-erasure and the writing phases, the potential difference between the maximum and minimum of the voltage signals applied to the signal electrodes is made larger than the potential difference formed between the selected scanning electrode $S_S$ and neighboring scanning electrodes, whereby pixels along a line are formed and a good image quality is provided.

FIG. 13 illustrates an arrangement of a display apparatus according to the present invention. The display apparatus includes a display panel comprising scanning electrodes 132, signal electrodes 133 and a ferroelectric liquid crystal (not specifically shown) disposed between these electrodes. The orientation of the ferroelectric liquid crystal is controlled at the pixel formed at each intersection of a matrix of the scanning electrodes 132 and signal electrodes 133 by a voltage applied across the electrodes.

The display apparatus further includes a signal electrode driver circuit 134 comprising a picture data shift register 1341 for storing gradational picture or image data serially applied through an information signal line 36, a line memory 1342 for storing gradational picture data supplied in parallel from the picture data shift register 1341, and a signal electrode driver 1343 for applying voltage signals to the signal electrodes 133 based on the picture data stored in the line memory 1342.

The display apparatus further includes a scanning electrode driver circuit 135 comprising an address decoder 1351 for addressing a scanning electrode among all the scanning electrodes 132 based on a signal from a scanning address data line 137, and a scanning electrode driver 1352 for applying a scanning or addressing voltage signal to the scanning electrodes 132.

The apparatus is controlled by a CPU 139 which receives clock pulses from an oscillator 130 and control a picture memory 138, the information signal line 136 and the scanning address data line 137 with respect to signal transfer.

As described above, according to the present invention, there is provided a driving method for an optical modulation device having a high response speed and pixels arranged at a high density, whereby a stable gradational display of good quality can be realized.

What is claimed is:

1. A driving method for an optical modulation device comprising a plurality of pixels arranged in a plurality of lines, each pixel being electrically connected to an optical modulation material and capable of forming a potential gradient when supplied with a voltage; said driving method comprising:
    a first step of forming in a line of pixels a written state in a width exceeding a prescribed width, and
    a second step of erasing an excess width to leave the written state in the prescribed width.

2. A method according to claim 1, which further comprises an erasure step for erasing a previous written state in the line of pixels.

3. A method according to claim 2, wherein the width of the line of pixels erased in the erasure step is substantially the same as the width written in the first step.

4. A method according to claim 1, wherein the optical modulation material is a ferroelectric liquid crystal.

5. A method according to claim 4, wherein said ferroelectric liquid crystal is a chiral smectic liquid crystal.

6. A method according to claim 5, wherein said chiral smectic liquid crystal is disposed in a layer thin enough to release its own helical structure in the absence of an electric field.

7. An optical modulation apparatus, comprising:
    an optical modulation device comprising a resistive film having thereon a plurality of elongated low-resistivity electrodes electrically connected to the resistive film, a plurality of elongated opposite electrodes disposed opposite to and intersecting with the low-resistivity electrodes, and an optical modulation material disposed between the resistive film and the opposite electrodes and showing a first and a second orientation state depending on an electric field applied thereto; and
    means for applying in an address period an address voltage signal to address a low-resistivity electrode thereby to form a potential gradient along a portion of the resistive film between the addressed low-resistivity electrode and an n-th ($n \geq 2$) low-resistivity electrode from the addressed lowresistivity electrode; and in the address period, applying to the opposite electrodes a voltage signal which in combination with the address voltage signal orients the optical modulation material to the first orientation state in a width perpendicular to the low-resistivity electrodes, and applying to a selected opposite electrode a voltage signal which in combination with the address voltage signal orients the optical modulation material to the second orientation state in said width.

8. An apparatus according to claim 7, wherein said address voltage signal comprises a voltage of one polarity and a voltage of the other polarity with respect to the voltage level of a non-addressed low-resistivity electrode.

9. An apparatus according to claim 8, wherein said address voltage signal further comprises a voltage which is the same as the voltage level of the non-addressed low-resistivity electrode.

10. An apparatus according to claim 7, wherein the opposite electrodes are supplied with voltage signals which comprise a voltage of one polarity and a voltage of the other polarity and have an average DC component of 0 during the address period.

11. An apparatus according to claim 7, wherein the optical modulation material is a ferroelectric liquid crystal.

12. An apparatus according to claim 11, wherein said ferroelectric liquid crystal is a chiral smectic liquid crystal.

13. An apparatus according to claim 12, wherein said chiral smectic liquid crystal is disposed in a layer thin enough to release its own helical structure in the absence of an electric field.

* * * * *